US011936289B2

United States Patent
Pfeilschifter et al.

(10) Patent No.: US 11,936,289 B2
(45) Date of Patent: Mar. 19, 2024

(54) VEHICLE ELECTRICAL SYSTEM

(71) Applicant: Vitesco Technologies GmbH, Regensburg (DE)

(72) Inventors: Franz Pfeilschifter, Munich (DE); Martin Götzenberger, Munich (DE); Felix Müller, Munich (DE)

(73) Assignee: Vitesco Technologies GmbH (DE)

( * ) Notice: Subject to any disclaimer, the term of this patent is extended or adjusted under 35 U.S.C. 154(b) by 157 days.

(21) Appl. No.: 17/623,402

(22) PCT Filed: Jul. 1, 2020

(86) PCT No.: PCT/EP2020/068468
§ 371 (c)(1),
(2) Date: Dec. 28, 2021

(87) PCT Pub. No.: WO2021/001406
PCT Pub. Date: Jan. 7, 2021

(65) Prior Publication Data
US 2022/0393573 A1 Dec. 8, 2022

(30) Foreign Application Priority Data
Jul. 4, 2019 (DE) ...................... 10 2019 209 854.1

(51) Int. Cl.
*H02M 1/42* (2007.01)
*B60L 50/60* (2019.01)
(Continued)

(52) U.S. Cl.
CPC ........... *H02M 1/4208* (2013.01); *B60L 50/60* (2019.02); *B60L 53/14* (2019.02); *B60L 53/20* (2019.02);
(Continued)

(58) Field of Classification Search
CPC ...... H02M 1/4208; B60L 53/20; B60L 50/60; B60L 53/14; H02J 7/0063; H02J 2207/20
See application file for complete search history.

(56) References Cited

U.S. PATENT DOCUMENTS 9,809,121 B2 * 11/2017 King ...................... B60L 53/20
2010/0078993 A1   4/2010 Ichikawa
(Continued)

FOREIGN PATENT DOCUMENTS

DE    102017001470 A1   11/2017
DE    102017213682 A1   2/2019
(Continued)

OTHER PUBLICATIONS

International Search Report and Written Opinion for International Application No. PCT/EP2020/068468, dated Oct. 2, 2020, with partial English translation, 10 pages.
(Continued)

*Primary Examiner* — Carlos Amaya
(74) *Attorney, Agent, or Firm* — Buchanan, Ingersoll & Rooney PC

(57) ABSTRACT

A vehicle electrical system is equipped with a DC charging connection, a rechargeable battery, a first DC-DC converter and an electrical drive. The first DC-DC converter has a first side. This is connected to a connecting point via a first switch. The first DC-DC converter has a second side to which the electrical drive is connected. The second side is connected to the rechargeable battery via a second switch and via a connecting point or is connected to the rechargeable battery directly. The vehicle electrical system has a second DC-DC converter. This is connected to one side of the first switch.

15 Claims, 1 Drawing Sheet

(51) Int. Cl.
  *B60L 53/14*  (2019.01)
  *B60L 53/20*  (2019.01)
  *H02J 7/00*  (2006.01)

(52) U.S. Cl.
  CPC ......... *H02J 7/0063* (2013.01); *H02J 2207/20* (2020.01)

(56) References Cited

U.S. PATENT DOCUMENTS

| | | | |
|---|---|---|---|
| 2014/0097676 A1 | 4/2014 | Kusumi | |
| 2018/0159425 A1* | 6/2018 | Hwang | ................ H02M 3/285 |
| 2018/0254658 A1* | 9/2018 | Koerner | ................ H02J 7/1423 |
| 2020/0180453 A1* | 6/2020 | Pfeilschifter | ........... B60L 58/20 |

FOREIGN PATENT DOCUMENTS

| | | |
|---|---|---|
| EP | 2169802 A1 | 3/2010 |
| KR | 101726421 B1 | 4/2017 |

OTHER PUBLICATIONS

International Search Report and Written Opinion for International Application No. PCT/EP2020/068468, dated Oct. 2, 2020, 15 pages (German).
German Examination Report for German Application No. 10 2019 209 854.1, dated Apr. 23, 2020, with English translation, 9 pages.
Korean Notice to Submit Response for Korean Application No. 10-2022-7003787, dated Oct. 17, 2023 with translation, 16 pages.

\* cited by examiner

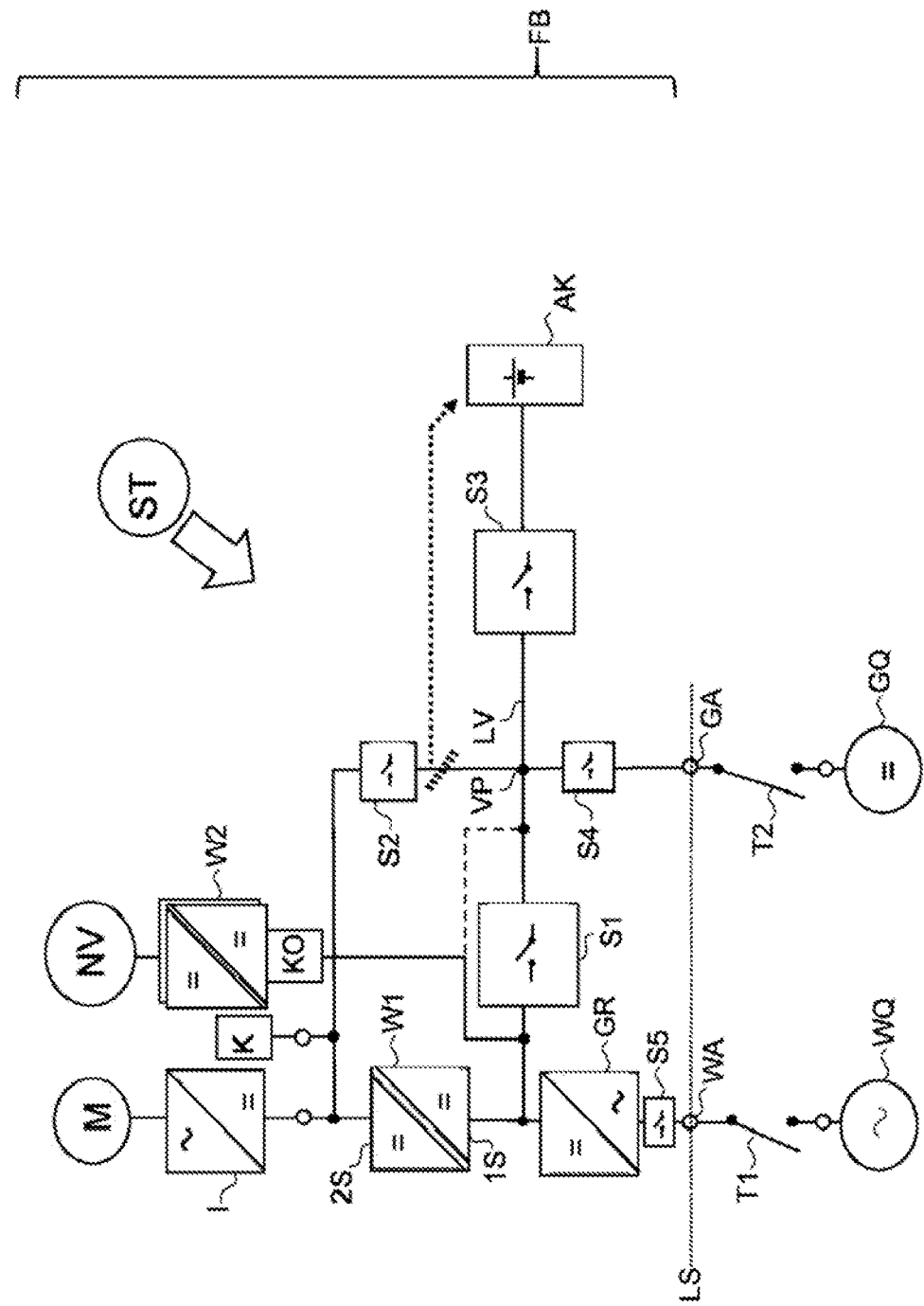

VEHICLE ELECTRICAL SYSTEM

CROSS REFERENCE TO RELATED APPLICATIONS

This application is the U.S. National Phase Application of PCT International Application No. PCT/EP2020/068468, filed Jul. 1, 2020, which claims priority to German Patent Application No. 10 2019 209 854.1, filed Jul. 4, 2019, the contents of such applications being incorporated by reference herein.

BACKGROUND OF THE INVENTION

Vehicles with an electrical drive have a rechargeable battery that can supply the electrical drive with energy. It is known that the vehicles have an appropriate charging connection for charging the rechargeable battery ("plug-in vehicles"). The functions of charging and supplying power to the electrical drive are provided by a vehicle electrical system. There are also electrical loads that have to be supplied with a lower voltage than the electrical drive, such as the 12 V on-board electronics.

SUMMARY OF THE INVENTION

An aspect of the invention is to present an option by way of which the rechargeable battery or the electrical drive, on the one hand, and the load, on the other hand, can be supplied with lower voltage in a simple manner.

This is achieved by the vehicle electrical system as claimed in the independent claim. Further properties, features, embodiments and advantages emerge from the dependent claims, the description and the FIGURE.

The vehicle electrical system described here has a rechargeable battery, a first DC-DC converter, a second DC-DC converter and an electrical drive. The rechargeable battery is connected to a first side of the first DC-DC converter via a first switch and to the second side of the DC-DC converter via a second switch. While the electrical drive is connected to the second side of the converter, the second DC-DC converter is connected to the first side of the first DC-DC converter (directly or via the first switch).

As a result, the electrical drive is provided in a manner isolated from the voltage source for the second DC-DC converter, since both the first converter and the second switch can be used to electrically isolate the second DC-DC converter from the electrical drive. This approach also allows the rechargeable battery to be connected to the second DC-DC converter and to be able to supply same with power, while the electrical drive can be disconnected.

As a result, at least one safety-relevant system of the vehicle can be supplied with power by means of the second DC-DC converter, for example a component such as an electric steering system or a controller of an electric brake (or the electric brake itself), if the electrical drive is defective or a fault is apparent on the second side of the first DC-DC converter. For instance, a short circuit on the second side of the first converter, for example caused by the electrical drive, can therefore be disconnected from the second DC-DC converter by means of the second switch and the first DC-DC converter. In addition, a fault on the second side of the first DC-DC converter can be disconnected from the rechargeable battery by means of the first DC-DC converter and the second switch, the rechargeable battery being able to supply the second DC-DC converter with power in this case, however. The second switch (and the first DC-DC converter) are therefore used to disconnect a possibly defective electrical system section containing the electrical drive, while the section of the on-board electrical system that supplies the second DC-DC converter with power can be supplied with power by the rechargeable battery. In addition, the second DC-DC converter allows the voltage level of the power supply to be matched to an operating voltage that is suitable for the components mentioned.

There is therefore a connecting point to which the rechargeable battery is connected and from which the first and the second switch are routed in order to connect the connecting point to the first or the second side of the first DC-DC converter. Since the second DC-DC converter is connected to the connecting point or to the first side of the first DC-DC converter, and the connecting point itself is connected to the rechargeable battery, the second switch (which is routed to the second side of the first DC-DC converter) can be used to switch off a part of the on-board electrical system, in particular a part containing the electrical drive, which can therefore be disconnected in the event of a defect.

Safety-relevant components such as an electric brake, an electric steering system or controllers thereof are connected to the second DC-DC converter, wherein other components such as driving assistance systems can also be connected thereto.

The DC connection can also be connected to the connecting point (via a switch, for example). As a result, the second DC-DC converter and therefore the components connected thereto can be supplied with power via the connecting point during DC charging, while the first DC-DC converter is not necessarily active. As a result of both the rechargeable battery and the second DC-DC converter being connected to the same connecting point to which the DC charging connection is also connected, energy can also be transferred from the connecting point or DC connection or rechargeable battery to the second DC-DC converter during the transfer of energy from the DC charging connection to the rechargeable battery.

A vehicle electrical system that has a DC charging connection, a rechargeable battery, a first DC-DC converter and an electrical drive is described. The first DC-DC converter (hereinafter also: first converter) has a first side that is connected to a connecting point via a first switch. The first converter has a second side to which the electrical drive is connected. The converter is set up to transfer energy between the first and the second side and to thereby change the voltage level. (This also applies to the second converter). The second side of the first converter is connected to the rechargeable battery, for example directly or via a second switch and via the connecting point. The vehicle electrical system has a second DC-DC converter that is connected to one side of the first switch. The second DC-DC converter is therefore connected to the connecting point, either directly or via the first switch. In other words, the second DC-DC converter is connected to the first side of the first converter either directly or via the first switch. The second DC-DC converter is also referred to below as the second converter.

The vehicle electrical system is preferably a high-voltage on-board electrical system. The DC charging connection is preferably designed in accordance with a standard for wired charging. The rechargeable battery is preferably a rechargeable traction battery, wherein the electrical drive is preferably used as the drive of the vehicle, and is therefore connected to an output of the vehicle. In particular, this concerns the vehicle in which the vehicle electrical system is provided. The rechargeable battery is, for example, a lithium rechargeable battery. The switches mentioned here are preferably bipolar and are set up to isolate a positive or negative voltage potential (therefore an all-pole connection) in each case or to provide a corresponding connection to the respective potential.

The second DC-DC converter is preferably connected (directly, i.e. without a switch or converter) to the first side of the first DC-DC converter or can be connected (directly) to the connecting point. The second DC-DC converter is in particular connected to the rechargeable battery, either directly, via the first switch and/or via a switch that is used to connect the rechargeable battery to the rest of the on-board electrical system.

The rechargeable battery is preferably connected to the connecting point via a third switch. This third switch is used to connect the rechargeable battery to the rest of the on-board electrical system in a switchable manner. The third switch and the rechargeable battery can be provided in a first housing, while the second switch and the converters are provided in another housing. A releasable plug connection can be provided between the third switch and the rest of the vehicle electrical system. The third switch can therefore be connected to the rest of the on-board electrical system via a releasable connection. The releasable connection comprises in particular at least one plug connection and one (at least two-core) cable.

The first and the second DC-DC converter are preferably each in the form of galvanically isolating DC-DC converters. The converters therefore each include at least one transformer that galvanically isolates the first side of the converter from the second side of the converter. The first and the second DC-DC converter can therefore have a chopper, at least one transformer and a rectifier (which are connected to one another in that order) in order to convert a first DC voltage and a second DC voltage in this way.

In particular, the vehicle electrical system comprises a low-voltage on-board electrical system branch that is connected to one side of the first switch (or to the connecting point or to the rechargeable battery) via the second DC-DC converter. The low-voltage on-board electrical system branch can therefore be supplied with power from the first side of the converter or from the connecting point via the second converter. In particular, the low-voltage on-board electrical system branch has a nominal voltage of 12 volts, 13 volts or 14 volts, in particular of 12 to 14 volts or of essentially 24 volts. The low-voltage on-board electrical system branch can also have a nominal voltage of 48 volts. The second DC-DC converter is set up to deliver a voltage of 12 to 14 volts, of essentially 24 volts or of essentially 48 volts on the side on which it is connected to the low-voltage on-board electrical system branch. The opposite side of the second converter is set up to operate at a voltage of essentially 400 volts, 600 volts or 800 volts and to generate the aforementioned nominal voltage of the low-voltage on-board electrical system branch from this voltage.

The second DC-DC converter, as a galvanically isolating converter, can also have a transformer, in particular a transformer that performs the galvanic isolation. In particular, the second DC-DC converter has a chopper, a galvanically isolating transformer and a rectifier, which are connected to one another in that order.

The second DC-DC converter has a high-voltage side that is connected to one side of the first switch (and that is therefore connected to the first side of the converter or to the connecting point). The high-voltage side can also be considered to be the first side of the second DC-DC converter, while the second side of the second converter is connected to the low-voltage on-board electrical system branch.

The rechargeable battery is preferably connected to the connecting point via a third switch. In particular, the DC charging connection is connected to the first switch or to the third switch via the fourth switch. The DC charging connection is also connected to the second switch via the fourth switch. In particular, the DC charging connection is connected to the first converter or to the first side thereof via the fourth switch and the first switch downstream thereof.

The vehicle electrical system can also have an AC charging connection. This is preferably connected to the first side of the DC-DC converter via a rectifier device of the vehicle electrical system. The rectifier therefore has an AC side that is connected to the AC charging connection, and also has a DC side that is connected to the first converter or to the first side thereof. In particular, the AC charging connection is connected to the first switch via the rectifier device.

The AC charging connection is connected to the connecting point via the rectifier device and the downstream first switch. The rechargeable battery is also connected to said connecting point via the third switch, with the result that the AC connection can charge the rechargeable battery via the rectifier and via the relevant switch. The rectifier device is preferably in the form of a power factor correction filter and therefore has a rectifying and step-up function. The rectifier device is preferably of three-phase design, but can also be of single-phase design. The rectifier device is preferably of three-phase design, but can also be of single-phase design. The rectifier device can be in the form of a full-wave rectifier, preferably in the form of a three-phase full-wave rectifier or in the form of a single-phase full-wave rectifier. The rectifier device can also be in the form of a controllable or non-controllable rectifier. The rectifier device is preferably in the form of a power factor correction filter, in particular in the form of a Vienna filter.

The right-hand voltage charging connection and the DC charging connection can be provided in the same charging connection module and are preferably configured in accordance with a standard for charging electrically operated vehicles.

Provision can be made for the third switch to be connected to the connecting point via a releasable connection. As mentioned, this releasable connection can comprise at least one plug connection element, preferably at least two plug elements that are connected to one another via an (at least two-core) cable. As a result, the third switch and the rechargeable battery can be accommodated in a housing that is connected to at least parts of the rest of the vehicle electrical system via the releasable connection.

The rechargeable battery and the third switch, on the one hand, and the first switch, the second switch, the first DC-DC converter and the second DC-DC converter, on the other hand, can be accommodated in different housings. A first housing can therefore enclose the rechargeable battery and the third switch, while a second housing encloses neither the rechargeable battery nor the third switch, but rather at least the first switch, the second switch, the first DC-DC converter and the second DC-DC converter.

The electrical drive is preferably in the form of a high-voltage component and in particular has a nominal voltage of at least 400 volts, 600 volts or 800 volts. Alternatively or in combination with this, at least one further high-voltage component can be connected to the second side of the first converter. The further high-voltage component can be, for example, an electrically heatable catalytic converter, or another electrical heating device, or an electrical machine for driving an electrical compressor.

The second DC-DC converter is preferably of polyphase design. In this case, the second DC-DC converter comprises a plurality of individual converters. These are connected to one another, preferably in parallel, on that side of the DC-DC converter that is connected to the low-voltage on-board electrical system. The plurality of individual converters can be connected to a first side of the first switch, in particular to the first side of the first converter or to the connecting point, via a configuration circuit. The configuration circuit is set up to connect the individual converters in series with one another in a first configuration state and to connect the individual converters in parallel with one another in a second configuration state. In particular, this concerns the side of the respective individual converters that are connected to one side of the first switch. In other words, the configuration circuit is connected to that side of the second converter that is averted from the low-voltage on-board electrical system branch.

Provision can be made for each individual converter to have a DC-link capacitor. Said DC-link capacitor is preferably provided at the point at which the individual converters are connected to the configuration circuit. Each individual converter therefore comprises a DC-link capacitor that is connected to one side of the first switch via the configuration circuit. The DC-link capacitors are connected in series or in parallel with one another, depending on the configuration state. In other words, the configuration circuit is configured to connect the DC-link capacitors in parallel or in series with one another in different configuration states. In particular, the DC-link capacitors are connected in series with one another when the configuration circuit is in the first configuration state. In particular, the DC-link capacitors are connected in series with one another when the configuration circuit is in the first configuration state. The DC-link capacitors are provided in particular at the inputs of the individual converters. These are located on that side of the second converter that is averted from the low-voltage on-board electrical system branch.

There can be a low-voltage rechargeable battery in the low-voltage on-board electrical system branch, while the rechargeable battery connected to the connecting point can be in the form of a high-voltage rechargeable battery. The rechargeable battery that is connected to the connecting point (in a switchable manner) preferably has a nominal voltage of at least 400, 600 or 800 volts. The rechargeable battery within the low-voltage on-board electrical system preferably has a nominal voltage of essentially 12 to 14 volts, essentially 24 volts or essentially 48 volts.

A controller can be provided that is connected to the first and second switches for actuating purposes, wherein said controller can furthermore also be connected to the third, fourth and/or fifth switches for actuating purposes. In addition, the controller can be connected to the first and the second converter for actuating purposes.

BRIEF DESCRIPTION OF THE DRAWINGS

The FIGURE serves to explain the vehicle electrical system described here and the manner of operation thereof in more detail.

DETAILED DESCRIPTION OF THE PREFERRED EMBODIMENTS

The vehicle electrical system FB shown is connected to an AC voltage source WQ and a DC voltage source GQ via a charging interface LS. Said voltage sources can be considered to be part of a charging station (outside of the vehicle electrical system FB). The respective sources WQ, GQ are connected to the relevant charging connections WA, GA of the vehicle electrical system FB via isolating switches T1, T2. In particular, these sources WA, GA are connected to the AC charging connection WA of the vehicle electrical system and to the DC charging connection GA of the vehicle electrical system FB.

The vehicle electrical system FB comprises a rechargeable battery AK that is connected to a first DC-DC converter W1 via a first switch S1. Said DC-DC converter has two sides (a first side 1S and a second side 2S) that are galvanically isolated from one another. The vehicle electrical system FB also comprises a second switch S2. Like the first switch S1, said second switch is connected to the connecting point VP. The rechargeable battery AK is also connected to this connecting point VP via a third switch S3. A fourth switch S4 connects the DC charging connection GA to the connecting point VP.

A releasable connection LV connects the third switch S3 (via which the rechargeable battery AK is connected to the connecting point VP) to the connecting point VP. The rechargeable battery is connected to a first side of the first DC-DC converter via a first switch and to the second side of the DC-DC converter via a second switch.

A second DC-DC converter W2 is connected to the first switch S1. In particular, the converter W2 is connected to one side of the first switch S1, in particular to that side of the first switch that is connected to the first side 1S of the first converter W1, or to the connecting point VP, that is to say to the first side of the first switch S1, which is connected to the connecting point VP. The latter connection is shown using dashed lines. Both possible connections are alternatives to one another. A low-voltage on-board electrical system branch NV is connected to the first side 1S of the first converter W1, or to the connecting point VP (to which the rechargeable battery is connected via the third switch S3), via the second converter W2. The low-voltage on-board electrical system branch NV can comprise (in addition to a second rechargeable battery) at least one safety-relevant component, for example an electric steering drive or the controller thereof, or an electric brake or the controller thereof. The rechargeable battery and both sides of the first converter W1 are preferably designed for high-voltage applications, in particular for nominal voltages of at least 400 volts. The circuit shown allows the low-voltage on-board electrical system branch to be supplied with power via the second converter W2, even if the second switch S2 is open in order to shed defective loads, for example.

The second switch S2 can connect the connecting point VP to the first converter W1 or to the second side 2S thereof. Alternatively (shown in dotted lines), the second switch S2 can connect the rechargeable battery AK to the first converter W1 or to the second side 2S thereof. Like the first switch S1, said second switch is connected to the connecting point VP.

The rechargeable battery is preferably connected to the connecting point via a third switch. The DC charging connection GA is therefore connected to the first side 1S of the first converter W1 via the fourth switch S4 and via the first switch S1. The AC connection WA is connected to the first side 1S of the first converter W1 (and therefore also to the first switch S1) via the fifth switch S5 and a rectifier device GR.

In the embodiment shown, the second DC-DC converter W2 is of polyphase configuration, in particular two-phase configuration. In the specific example shown, the second converter W2 comprises two individual converters that are connected to the low-voltage on-board electrical system branch NV. A configuration circuit KO connects the second converter W2 (or the individual converters thereof) to one side of the first switch S1. The configuration circuit KO is set up to connect the sides of the individual converters that are connected to the first switch S1 in parallel or in series with one another in a switchable manner (and also to connect these sides to the first switch). The individual converters of the second converter W2 are connected to one another, preferably in parallel, on the low-voltage on-board electrical system branch NV side. That side of the second converter W2 that is connected to one side of the first switch S1 comprises one or more DC-link capacitors, and comprises a plurality of DC-link capacitors in the case of a plurality of individual converters. Said DC-link capacitors are also connected in series or in parallel with one another by means of the configuration circuit KO, in particular since they are connected in parallel at the respective inputs of the individual converters.

In addition to the inverter I and the motor M, which together are part of the electrical drive, a high-voltage component K is connected to the second side 2S of the first converter W1. It can be seen that the second converter W2 is not connected like a load or component of this type, but rather to the first side 1S of the first converter. The electrical drive and the second converter are therefore connected to two different, opposite sides 1S, 2S of the first converter W1.

There can be a controller ST that is connected to the first and the second switch, preferably also to the third switch, the fourth switch and the fifth switch, if present, for actuating purposes. The controller ST can also be connected to the first converter W1 and the second converter W2 for actuating purposes in order to at least set the activity state (inactive/active) thereof.

The invention claimed is:

1. A vehicle electrical system comprising:
   a DC charging connection;
   a rechargeable battery;
   a first DC-DC converter; and
   an electrical drive,
   wherein the first DC-DC converter:
   i) has a first side that is connected to a connecting point via a first side of a first switch,
   ii) has a second side connected to:
      a) the electrical drive and,
      b) connected to the rechargeable battery via a second switch and either the connecting point or directly connected to the rechargeable battery, and
   wherein the vehicle electrical system has a second DC-DC converter that is either connected to the first side of the first switch or connected directly to the connecting point.

2. The vehicle electrical system as claimed in claim 1, wherein the second DC-DC converter is connected to the first side of the first DC-DC converter or is connected to the connecting point.

3. The vehicle electrical system as claimed in claim 1, wherein the rechargeable battery is connected to the connecting point via a third switch.

4. The vehicle electrical system as claimed in claim 1, wherein the first and the second DC-DC converter are each galvanically isolating DC-DC converters.

5. The vehicle electrical system as claimed in claim 1, wherein a low-voltage on-board electrical system branch of the vehicle electrical system is connected to one side of the first switch via the second DC-DC converter.

6. The vehicle electrical system as claimed claim 1, wherein the second DC-DC converter has a high-voltage side that is connected to one side of the first switch and has a low-voltage side that is connected to the low-voltage on-board electrical system branch.

7. The vehicle electrical system as claimed in claim 2, wherein the rechargeable battery is connected to the connecting point via a third switch.

8. The vehicle electrical system as claimed in claim 1, which also has an AC charging connection that is connected to the first side of the first DC-DC converter via a rectifier device of the vehicle electrical system.

9. The vehicle electrical system as claimed in claim 8, wherein the AC charging connection is connected to the rectifier device via a fifth switch and the rectifier device is connected to the first side of the first DC-DC converter via the fifth switch.

10. The vehicle electrical system as claimed in claim 8, wherein the rectifier device is in the form of a power factor correction filter.

11. The vehicle electrical system as claimed in claim 1, wherein the DC charging connection is connected to the connecting point via a fourth switch.

12. The vehicle electrical system as claimed in claim 3, wherein the rechargeable battery and the third switch, on the one hand, and the first switch, the second switch, the first DC-DC converter and the second DC-DC converter, on the other hand, are accommodated in different housings.

13. The vehicle electrical system as claimed in claim 1, wherein the electrical drive is in the form of a high-voltage component and at least one further high-voltage component is connected to the second side of the first DC-DC converter.

14. The vehicle electrical system as claimed in claim 1, wherein the second DC-DC converter has a plurality of individual converters that are connected to one side of the first switch via a configuration circuit, wherein the configuration circuit connects the individual converters in series with one another in a first configuration state and connects the individual converters in parallel with one another in a second configuration state.

15. The vehicle electrical system as claimed in claim 14, wherein each individual converter has a DC-link capacitor that is connected to one side of the first switch via the configuration circuit, wherein the DC-link capacitors are connected in series or in parallel with one another, depending on the configuration state.

* * * * *